US011614337B2

(12) United States Patent
Soderberg

(10) Patent No.: US 11,614,337 B2
(45) Date of Patent: *Mar. 28, 2023

(54) SYSTEMS AND METHODS FOR THE CLASSIFICATION OF GEOGRAPHIC LOCATIONS BASED ON VEHICLE TRIP LOGS

(71) Applicant: Volvo Car Corporation, Gothenburg (SE)

(72) Inventor: Joakim Soderberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,953

(22) Filed: Jan. 4, 2022

(65) Prior Publication Data

US 2022/0120580 A1   Apr. 21, 2022

Related U.S. Application Data

(63) Continuation of application No. 16/375,886, filed on Apr. 5, 2019, now Pat. No. 11,248,924.

(51) Int. Cl.
*G01C 21/36* (2006.01)
*G07C 5/08* (2006.01)
*G01C 21/20* (2006.01)
*G01C 21/26* (2006.01)
(Continued)

(52) U.S. Cl.
CPC ..... *G01C 21/3617* (2013.01); *G01C 21/3673* (2013.01); *G01C 21/3697* (2013.01); *G07C 5/0841* (2013.01); *G01C 21/20* (2013.01); *G01C 21/26* (2013.01); *G01C 21/28* (2013.01); *G01C 21/34* (2013.01)

(58) Field of Classification Search
CPC ............ G01C 21/3617; G01C 21/3673; G01C 21/3697; G01C 21/20; G01C 21/26; G01C 21/28; G01C 21/34; G07C 5/0841
See application file for complete search history.

(56) References Cited

U.S. PATENT DOCUMENTS 8,612,134 B2   12/2013   Zheng et al.
9,042,908 B2   5/2015    Dai et al.
9,141,995 B1   9/2015    Brinkmann et al.
(Continued)

*Primary Examiner* — Behrang Badii
*Assistant Examiner* — Jay Khandpur
(74) *Attorney, Agent, or Firm* — Clements Bernard Walker; Christopher L. Bernard

(57) ABSTRACT

A system and method for the classification of geographic locations based on vehicle trip logs, including: grouping a plurality of trip records by vehicle, wherein the plurality of trip records include start times and locations and stop times and locations; sorting the plurality of trip records for a vehicle in one of descending or ascending order with respect to stop times; calculating a plurality of time differences between consecutive trips of the plurality of trip records; storing the plurality of time differences in a stop time array; for a first plurality of time differences, storing the associated stop locations in a first location array; for a second plurality of stop times, storing the associated stop locations in a second location array; and computing a time difference median for each of the first location array and the second location array and returning the time difference medians as results for each location.

20 Claims, 6 Drawing Sheets

(51) Int. Cl.
*G01C 21/34* (2006.01)
*G01C 21/28* (2006.01)

(56) References Cited

U.S. PATENT DOCUMENTS

| | | |
|---|---|---|
| 9,282,430 B1 * | 3/2016 | Brandmaier ........... G07C 5/008 |
| 9,466,156 B2 | 10/2016 | Getchius |
| 10,163,275 B1 | 12/2018 | Brinkmann et al. |
| 2008/0103686 A1 * | 5/2008 | Alberth ................ G01C 21/343 |
| | | 701/532 |
| 2010/0312464 A1 | 12/2010 | Fitzgerald et al. |
| 2017/0099582 A1 | 4/2017 | Boesen |
| 2018/0058875 A1 * | 3/2018 | Wan ........................ G01C 21/32 |
| 2019/0197894 A1 * | 6/2019 | Sun ........................ H04L 51/046 |

* cited by examiner

```
VEHICLEID, ENDLATITUDE, ENDLONGITUDE, ENDTIME, STARTLATITUDE, STARTLONGITUDE,
STARTTIME. ¶
YV4A22PK1J1343233, 37.3850479126, -122.063842773, 2018-06-18 16:00:48.000,
37.385635376, -122.062149048, 2018-06-18 ¶
YV4A22PK9J1207514, 37.9359664917, -122.534118652, 2018-07-04 16:51:13.000,
37.9502868652, -122.5407771484,2018-07-04 ¶
YV4A22PK8J1214616, 47.55339|81323, -122.313300354, 2018-06-05 15:28:00.000,
47.5365529541, -122.2859972595, 15:28:05.0753, ¶
YV4A22PK1H1119891, 47.7344970703, -122.1480866548, 2018-06-07 20:41:37.000,
47.7554321289, -122.151046753, 2018-06-07¶
```

Fig. 3

```
VEHICLEID, ENDLATITUDE, ENDLONGITUDE, ENDTIME, STARTLATITUDE, STARTLONGITUDE, STARTTIME, ¶
YV4A22PK1J1343233, 37.3850479126, -122.063842773, 2018-06-18 16:00:48.000, 37.385635376, -122.062149048, 2018-06-18 HOME¶
YV4A22PK9J1207514, 37.9359664917, -122.534118652, 2018-07-04 16:51:13.000, 37.9502868652, -122.5407711484, 2018-07-04 WORK¶
YV4A22PK8J1214616, 47.5533981323, -122.313300354, 2018-06-05 15:28:00.000, 47.536529541, -122.285972595, 15:28:05.0753, WORK¶
YV4A22PK1H1119891, 47.7344970703, -122.148086548, 2018-06-07 20:41:37.000, 47.7554321289, -122.151046753, 2018-06-07 HOME¶
```

Fig. 4

Driver 1: Home / Work Bay area
~ 100 / 200 data points (start/stops) for each vehicle Driver 2: Home / Work Seattle

SYSTEMS AND METHODS FOR THE CLASSIFICATION OF GEOGRAPHIC LOCATIONS BASED ON VEHICLE TRIP LOGS

CROSS-REFERENCE TO RELATED APPLICATION

The present disclosure is a continuation (CON) of co-pending U.S. patent application Ser. No. 16/375,886, filed on Apr. 5, 2019, and entitled "SYSTEMS AND METHODS FOR THE CLASSIFICATION OF GEOGRAPHIC LOCATIONS BASED ON VEHICLE TRIP LOGS," the contents of which are incorporated in full by reference herein.

TECHNICAL FIELD

The present disclosure relates generally to the automotive field. More specifically, the present disclosure relates to systems and methods for the classification of geographic locations based on vehicle trip logs.

BACKGROUND

Geographic place information has become an increasingly integrated and important element in web and online services, which is manifested by the increasing sophistication and adoption of online mapping, navigational global positioning systems (GPS), and location-aware search.

Vehicle telematics is based on the idea of gathering, storing, and transmitting information about a vehicle for tracking purposes. In recent years, most vehicles are equipped with mobile broadband and multiple processors that are able to report on nearly every detail of vehicle performance—from speed and idling, to fuel use, to low tire pressure, and more.

Similar to life-logging systems, vehicle telematics can be used to continuously store the places visited by drivers with points of interest (POI), which external systems can then explore to recommend other services based on an out-of-the-car context. Further, it is conceivable to create a valuable marketplace of such data.

Driver scores can be computed by converting vehicle sensor data into driving and behavior intelligence for operational insights and business intelligence. Three corresponding domains of applications are recognized:
  Driving event analytic—accurately detects the frequency, intensity, and duration of accelerations, brakes, turns, speeding, coasting, etc.;
  Trip analytics—delivers in-depth trip insights with sequential events associated with an entire trip; and
  Driver lifestyle profiling—provides a holistic driver lifestyle profile, based on out-of-the-car context and activity monitoring.

Thus, the concept of trip stop time is recognized herein, defined as the time passed between two consecutive trips for an individual vehicle. By analyzing trip stop times one can distinguish and utilize certain behavioral patterns.

SUMMARY

The objective of the algorithm of the present disclosure is to label trip stops as "Home," "Work," or "Point of Interest," for example. Knowing the location or classification of a stop enables the inference of higher-level abstractions, such as: "easy commute," "frequent flyer," or "city-worker," for example. Thus, the present disclosure enables the provision of more effective service targeting, push-notifications, and the like.

Given a list of geo-location start/stop points, timestamps, and Vehicle Identification Numbers (VINs), the present disclosure provides an algorithm that analyzes trip stop times and geo-locations with the objective to classify each stop. Such stop classifications can also be used to form a "fingerprint" for a driver, providing a broad classification methodology. The output of the systems and methods provided herein is generally a list of labeled stops.

In one exemplary embodiment, the present disclosure provides a method for the classification of geographic locations based on vehicle trip logs, the method including: grouping a plurality of trip records by vehicle, wherein the plurality of trip records include start times and locations and stop times and locations; sorting the plurality of trip records for a vehicle in one of descending or ascending order with respect to stop times; calculating a plurality of time differences between consecutive trips of the plurality of trip records for the vehicle; storing the plurality of time differences in a stop time array; for a first plurality of time differences, storing the associated stop locations in a first location array; for a second plurality of stop times, storing the associated stop locations in a second location array; filtering outliers and removing candidate locations; and computing a time difference median for each of the first location array and the second location array and returning the time difference medians as results for each location. The method further includes applying the results for each location to subsequent time differences to attach one of a first location label and second location label to each time difference. The method further includes utilizing the attached first location labels and second location labels to classify a driver of the vehicle. The start times and locations and stop times and locations for each of the plurality of trip records are obtained from a vehicle telematics system. The method further includes utilizing the attached first location labels and second location labels to alert a driver to the vehicle to one or more targeted products or services.

In another exemplary embodiment, the present disclosure provides a computer-readable medium storing instructions for the classification of geographic locations based on vehicle trip logs executed by a processor to perform the steps of: grouping a plurality of trip records by vehicle, wherein the plurality of trip records include start times and locations and stop times and locations; sorting the plurality of trip records for a vehicle in one of descending or ascending order with respect to stop times; calculating a plurality of time differences between consecutive trips of the plurality of trip records for the vehicle; storing the plurality of time differences in a stop time array; for a first plurality of time differences, storing the associated stop locations in a first location array; for a second plurality of stop times, storing the associated stop locations in a second location array; filtering outliers and removing candidate locations; and computing a time difference median for each of the first location array and the second location array and returning the time difference medians as results for each location. The steps further include applying the results for each location to subsequent time differences to attach one of a first location label and second location label to each time difference. The steps further include utilizing the attached first location labels and second location labels to classify a driver of the vehicle. The start times and locations and stop times and locations for each of the plurality of trip records are obtained from a vehicle telematics system. The steps further include utilizing the attached first location labels and second location labels to alert a driver to the vehicle to one or more targeted products or services. The processor resides in one or more of the vehicle and in a cloud network.

In a further exemplary embodiment, the present disclosure provides a system for the classification of geographic locations based on vehicle trip logs, the system including: a vehicle telematics system operable for providing a plurality of trip records for a vehicle including start times and locations and stop times and locations; a processor executing one or more algorithms operable for: sorting the plurality of trip records in one of descending or ascending order with respect to stop times; calculating a plurality of time differences between consecutive trips of the plurality of trip records; storing the plurality of time differences in a stop time array; for a first plurality of time differences, storing the associated stop locations in a first location array; for a second plurality of stop times, storing the associated stop locations in a second location array; filtering outliers and removing candidate locations; and computing a time difference median for each of the first location array and the second location array and returning the time difference medians as results for each location. The one or more algorithms are further operable for applying the results for each location to subsequent time differences to attach one of a first location label and second location label to each time difference. The one or more algorithms are further operable for utilizing the attached first location labels and second location labels to classify a driver of the vehicle. The start times and locations and stop times and locations for each of the plurality of trip records are obtained from the vehicle telematics system through a cloud network. The one or more algorithms are further operable for utilizing the attached first location labels and second location labels to alert a driver to the vehicle to one or more targeted products or services. The processor resides in one or more of the vehicle and in a cloud network.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a table illustrating exemplary input to the method of FIG. 2;

FIG. 4 is a table illustrating exemplary output from the method of FIG. 2;

DESCRIPTION OF EMBODIMENTS

Again, the objective of the algorithm of the present disclosure is to label trip stops as "Home," "Work," or "Point of Interest," for example. Knowing the location or classification of a stop enables the inference of higher-level abstractions, such as: "easy commute," "frequent flyer," or "city-worker," for example. Thus, the present disclosure enables the provision of more effective service targeting, push-notifications, and the like.

Given a list of geo-location start/stop points, timestamps, and VINs, the present disclosure provides an algorithm that analyzes trip stop times and geo-locations with the objective to classify each stop. Such stop classifications can also be used to form a "fingerprint" for a driver, providing a broad classification methodology. The output of the systems and methods provided herein is generally a list of labeled stops.

Figure 1:
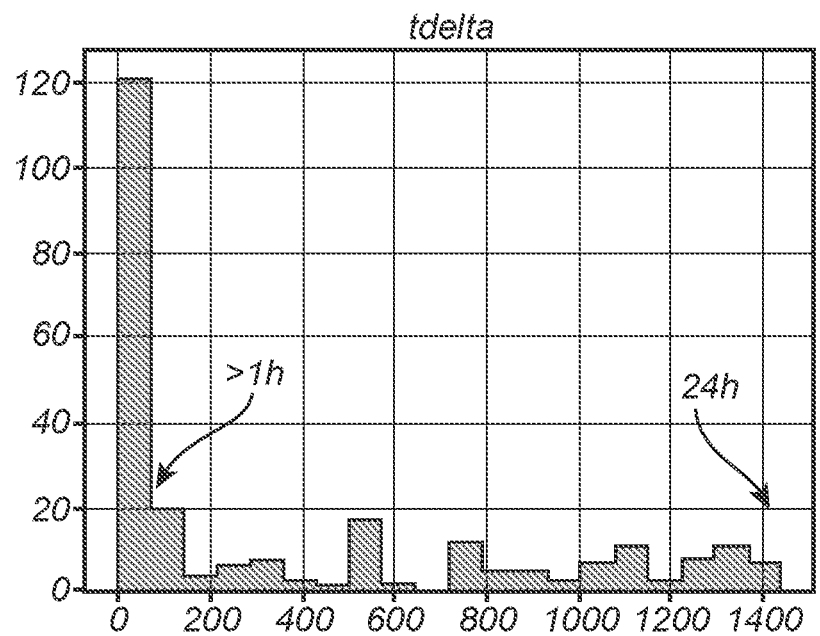
FIG. 1 is a series of plots illustrating exemplary trip stop time distributions for two vehicles.
Figure 1:
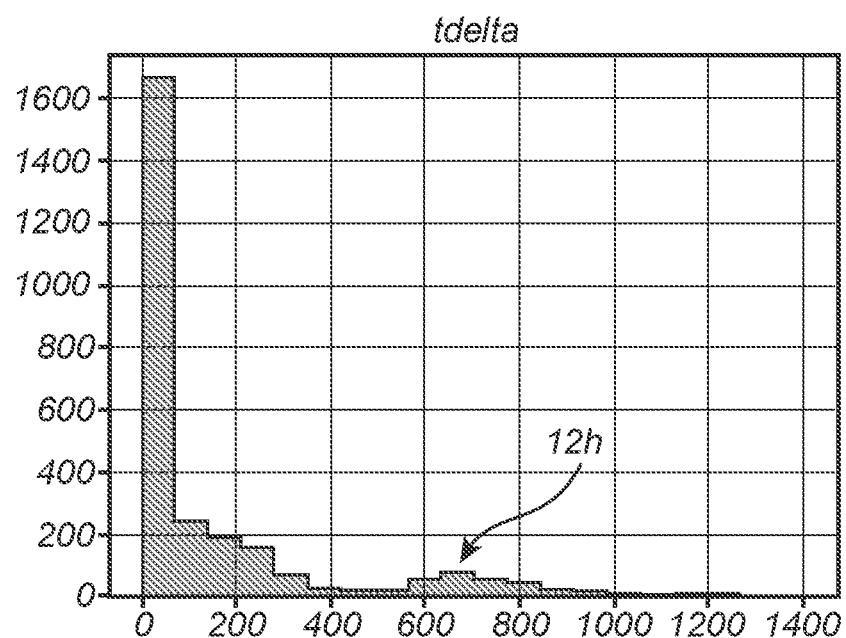

FIG. 1 illustrates the distribution of trip stop times for two vehicles. In the histogram at the top, it can be seen that 120 stops are less than 60 min in length and that 5 stops are longer than 24 h. The histogram at the bottom shows no stops longer than 12 h, indicating that the vehicle is often on the move. It is these stops that are classified and used herein.

Figure 2:
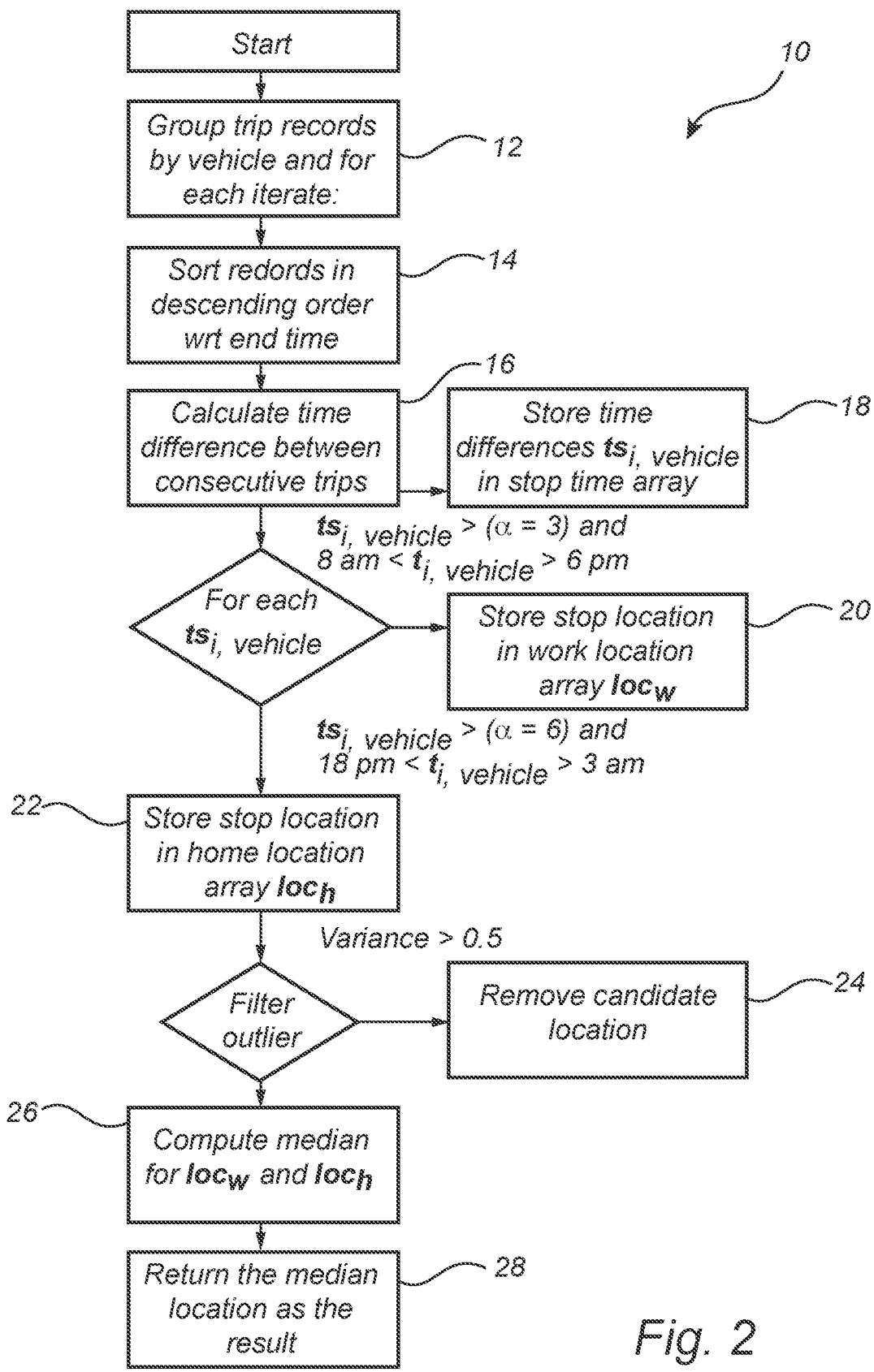
FIG. 2 is a flowchart illustrating one exemplary embodiment of the method for the classification of geographic locations based on vehicle trip logs of the present disclosure.

Referring now specifically to FIG. 2, in one exemplary embodiment, the method 10 for the classification of geographic locations based on vehicle trip logs of the present disclosure starts with the grouping of trip records by vehicle and for each group the following is iterated 12. The records are first sorted in descending order with respect to end time 14. The time difference between consecutive trips is then calculated 16. The time differences, $ts_{i,vehicle}$, are then stored in a stop time array 18. For each $ts_{i,vehicle}$, each stop location is then stored in a work location array, $loc_w$ 20. The stop locations are then stored in a home location array, $loc_h$ 22. The outliers are then filtered and candidate locations are removed 24. Subsequently, the median is computed for $loc_w$ and $loc_h$ 26. Finally, the median location is returned as the result for each trip stop 28.

FIG. 3 provides a table illustrating exemplary input to the method of FIG. 2, while FIG. 4 provides a table illustrating exemplary output from the method of FIG. 2. Again, given the list of geo-location start/stop points, timestamps, and VINs, the present disclosure provides an algorithm that analyzes trip stop times and geo-locations with the objective to classify each stop. Such stop classifications can also be used to form a "fingerprint" for a driver, providing a broad classification methodology. The output of the systems and methods provided herein is generally a list of labeled stops.

It should be noted that all assumptions utilized above can be refined iteratively or based on the output of a machine learning (ML) algorithm. In this manner, the accuracy of results can be improved.

Again, the non-parametric model provided herein groups trips per vehicle and sorts them in descending time order, for example. The stop times between each trip are then calculated. For each trip, a stop is then classified as a "home stop" if it is at "night" and a certain duration, for example. Likewise, for each trip, a stop is then classified as a "work stop" if it is during the "day" and a certain duration, for example. All locations are then collected for each type and a median located is selected to represent the final result, or label. Finally, outliers are filtered.

Figure 5:
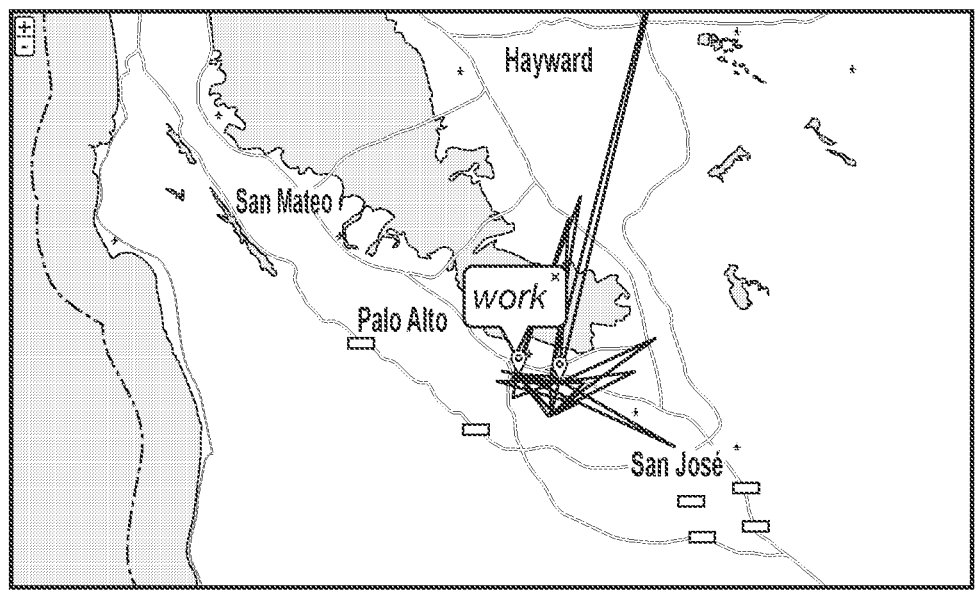
FIG. 5 is a series of plots illustrating exemplary location classifications for two vehicles.
Figure 5:
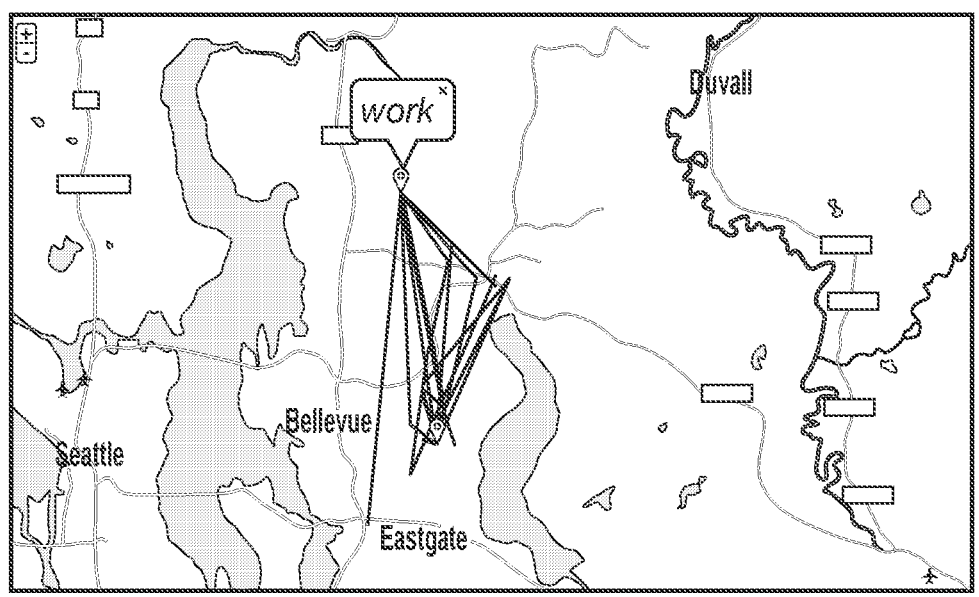

FIG. 5 is a series of plots illustrating exemplary location classifications for two vehicles, as described. By way of evaluation, work/home location was classified for 467 drivers in North America during June/July 2018:

failed home detections: 12 (2.5%)
failed work detections: 29 (6.2%)

The true error rate was 0.13±0.087 (95% confidence), demonstrating the effectiveness of the present methodologies.

Figure 6:
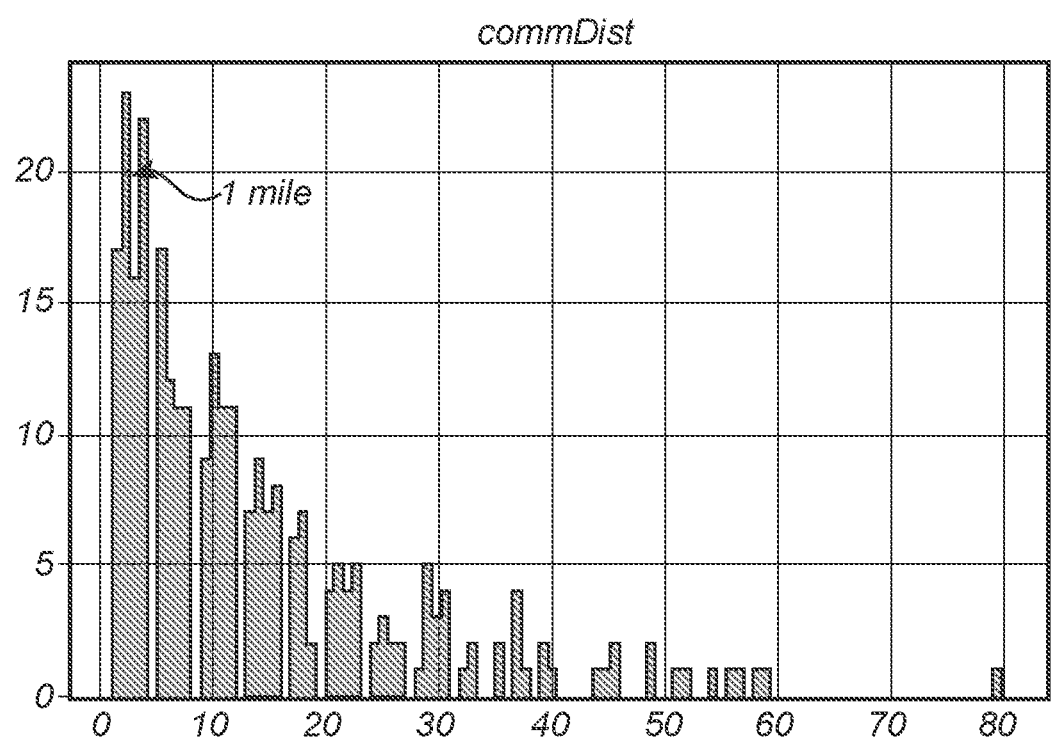
FIG. 6 is a plot illustrating exemplary driver scoring for a driver.

FIG. 6 is a plot illustrating exemplary driver scoring for a driver. The exemplary target set used was "easy commuter," "city worker," and "frequent flyer."

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The location classification scheme provided herein enables a wide variety of driver scoring and profiling techniques and may be used to recommend targeted products or services through a vehicle, mobile device app, or the like. The location classification scheme provided herein may also be used to provide the context-aware personalization of improved navigation by anticipating stops, such as: commuting to work, dining out, shopping, etc. With regard to driver scoring, drivers and trips can be classified into categories, such as: legal driver, easy commuter, green commuter, early bird, night worker, city worker, rural worker, normal commute, long commute, busy commute, short commute, easy commute, city home, rural home, etc. By combining the algorithm with reverse geo-coding and venue databases, further semantics can be added, such as: movie lover, recreational walker, recreational biker, weekend-adventurer, concert-goer, etc. Advantageously, the algorithm of the present disclosure can work without any external data, i.e., it can run offline, depending only on timestamp and end latitude/longitude data.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method for the classification of geographic locations based on vehicle trip logs, the method comprising:
   grouping a plurality of trip records by vehicle, wherein the plurality of trip records comprise start times and locations and stop times and locations;
   calculating a plurality of time differences between consecutive trips of the plurality of trip records for the vehicle, wherein each of the plurality of time differences is defined as a difference between a stop time of a trip and a start time of a subsequent trip;
   storing the plurality of time differences in a stop time array;
   for a first plurality of time differences, storing the associated stop locations in a first location array;
   for a second plurality of stop times, storing the associated stop locations in a second location array;
   computing a time difference median for each of the first location array and the second location array and returning the time difference medians as results for each location;
   applying the results comprising the time difference medians for stops at each location to subsequent observed time differences reflecting stop times to attach one of a first location label and second location label to each subsequent observed time difference reflecting a stop time; and utilizing the attached first location labels and second location labels, the time difference medians for stops at each location, and a number of stops for a driver during a predetermined time period to classify the driver of the vehicle.

2. The method of claim 1, further comprising applying the results for each location and the observed day and time of day to subsequent observed time differences to attach one of the first location label and second location label to each subsequent observed time difference.

3. The method of claim 1, further comprising utilizing the attached first location labels and second location labels, the time difference medians for stops at each location, associated timestamps, and the number of stops for the driver during a predetermined time period to classify the driver of the vehicle.

4. The method of claim 1, wherein the start times and locations and stop times and locations for each of the plurality of trip records are obtained from a vehicle telematics system.

5. The method of claim 1, further comprising utilizing the attached first location labels and second location labels and the classification of the driver of the vehicle to alert the driver of the vehicle to one or more targeted products or services.

6. A computer-readable medium storing instructions for the classification of geographic locations based on vehicle trip logs executed by a processor to perform the steps of:

grouping a plurality of trip records by vehicle, wherein the plurality of trip records comprise start times and locations and stop times and locations;

calculating a plurality of time differences between consecutive trips of the plurality of trip records for the vehicle, wherein each of the plurality of time differences is defined as a difference between a stop time of a trip and a start time of a subsequent trip;

storing the plurality of time differences in a stop time array;

for a first plurality of time differences, storing the associated stop locations in a first location array;

for a second plurality of stop times, storing the associated stop locations in a second location array;

computing a time difference median for each of the first location array and the second location array and returning the time difference medians as results for each location;

applying the results comprising the time difference medians for stops at each location to subsequent observed time differences reflecting stop times to attach one of a first location label and second location label to each subsequent observed time difference reflecting a stop time; and utilizing the attached first location labels and second location labels, the time difference medians for stops at each location, and a number of stops for a driver during a predetermined time period to classify the driver of the vehicle.

7. The computer-readable medium of claim 6, wherein the steps further comprise applying the results for each location and the observed day and time of day to subsequent observed time differences to attach one of the first location label and second location label to each subsequent observed time difference.

8. The computer-readable medium of claim 6, wherein the steps further comprise utilizing the attached first location labels and second location labels, the time difference medians for stops at each location, associated timestamps, and the number of stops for the driver during a predetermined time period to classify the driver of the vehicle.

9. The computer-readable medium of claim 6, wherein the start times and locations and stop times and locations for each of the plurality of trip records are obtained from a vehicle telematics system.

10. The computer-readable medium of claim 6, wherein the steps further comprise utilizing the attached first location labels and second location labels and the classification of the driver of the vehicle to alert the driver of the vehicle to one or more targeted products or services.

11. The computer-readable medium of claim 6, wherein the processor resides in one or more of the vehicle and in a cloud network.

12. A system for the classification of geographic locations based on vehicle trip logs, the system comprising:

a vehicle telematics system operable for providing a plurality of trip records for a vehicle comprising start times and locations and stop times and locations;

a processor executing one or more algorithms operable for:

calculating a plurality of time differences between consecutive trips of the plurality of trip records, wherein each of the plurality of time differences is defined as a difference between a stop time of a trip and a start time of a subsequent trip;

storing the plurality of time differences in a stop time array;

for a first plurality of time differences, storing the associated stop locations in a first location array;

for a second plurality of stop times, storing the associated stop locations in a second location array;

computing a time difference median for each of the first location array and the second location array and returning the time difference medians as results for each location;

applying the results comprising the time difference medians for stops at each location to subsequent observed time differences reflecting stop times to attach one of a first location label and second location label to each subsequent observed time difference reflecting a stop time; and utilizing the attached first location labels and second location labels, the time difference medians for stops at each location, and a number of stops for a driver during a predetermined time period to classify the driver of the vehicle.

13. The system of claim 12, wherein the one or more algorithms are further operable for applying the results for each location and the observed day and time of day to subsequent observed time differences to attach one of the first location label and second location label to each subsequent observed time difference.

14. The system of claim 12, wherein the one or more algorithms are further operable for utilizing the attached first location labels and second location labels, the time difference medians for stops at each location, associated timestamps, and the number of stops for the driver during a predetermined time period to classify the driver of the vehicle.

15. The system of claim 12, wherein the start times and locations and stop times and locations for each of the plurality of trip records are obtained from the vehicle telematics system through a cloud network.

16. The system of claim 12, wherein the one or more algorithms are further operable for utilizing the attached first location labels and second location labels and the classification of the driver of the vehicle to alert the driver of the vehicle to one or more targeted products or services.

17. The system of claim 12, wherein the processor resides in one or more of the vehicle and in a cloud network.

18. The method of claim 1, wherein the one of the first location label and second location label attached to each time difference is used to categorize the time difference defined as the difference between the stop time of the trip and the start time of the subsequent trip.

19. The computer-readable medium of claim 6, wherein the one of the first location label and second location label attached to each time difference is used to categorize the time difference defined as the difference between the stop time of the trip and the start time of the subsequent trip.

20. The system of claim 12, wherein the one of the first location label and second location label attached to each time difference is used to categorize the time difference defined as the difference between the stop time of the trip and the start time of the subsequent trip.

* * * * *